March 2, 1948. C. H. PETSKEYES 2,437,124
FEEDING DEVICE FOR MULTIPLE BLADE BREAD SLICING MACHINES
Filed June 9, 1945 3 Sheets-Sheet 1

INVENTOR.
Charles H. Petskeyes
BY
His Attorney

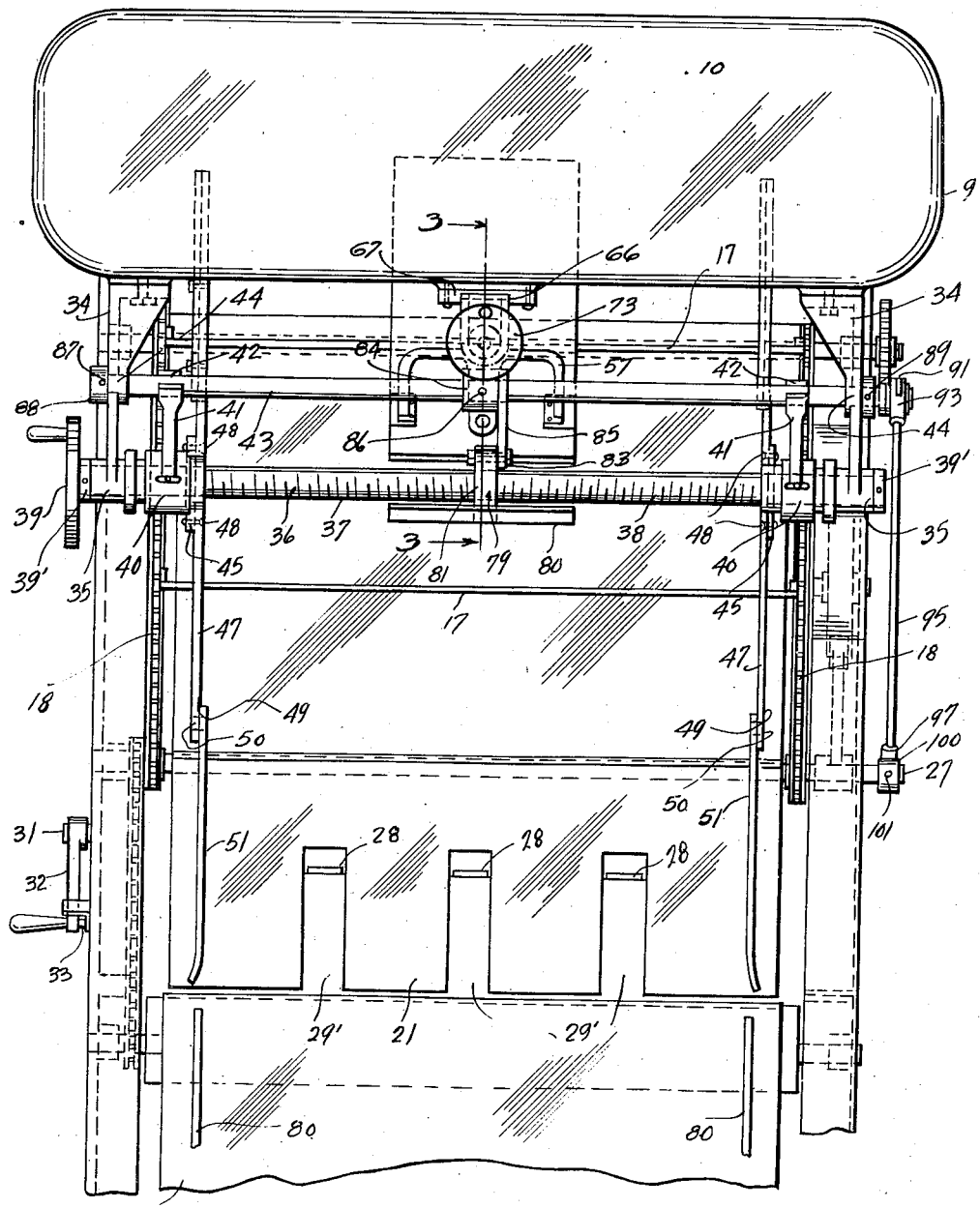

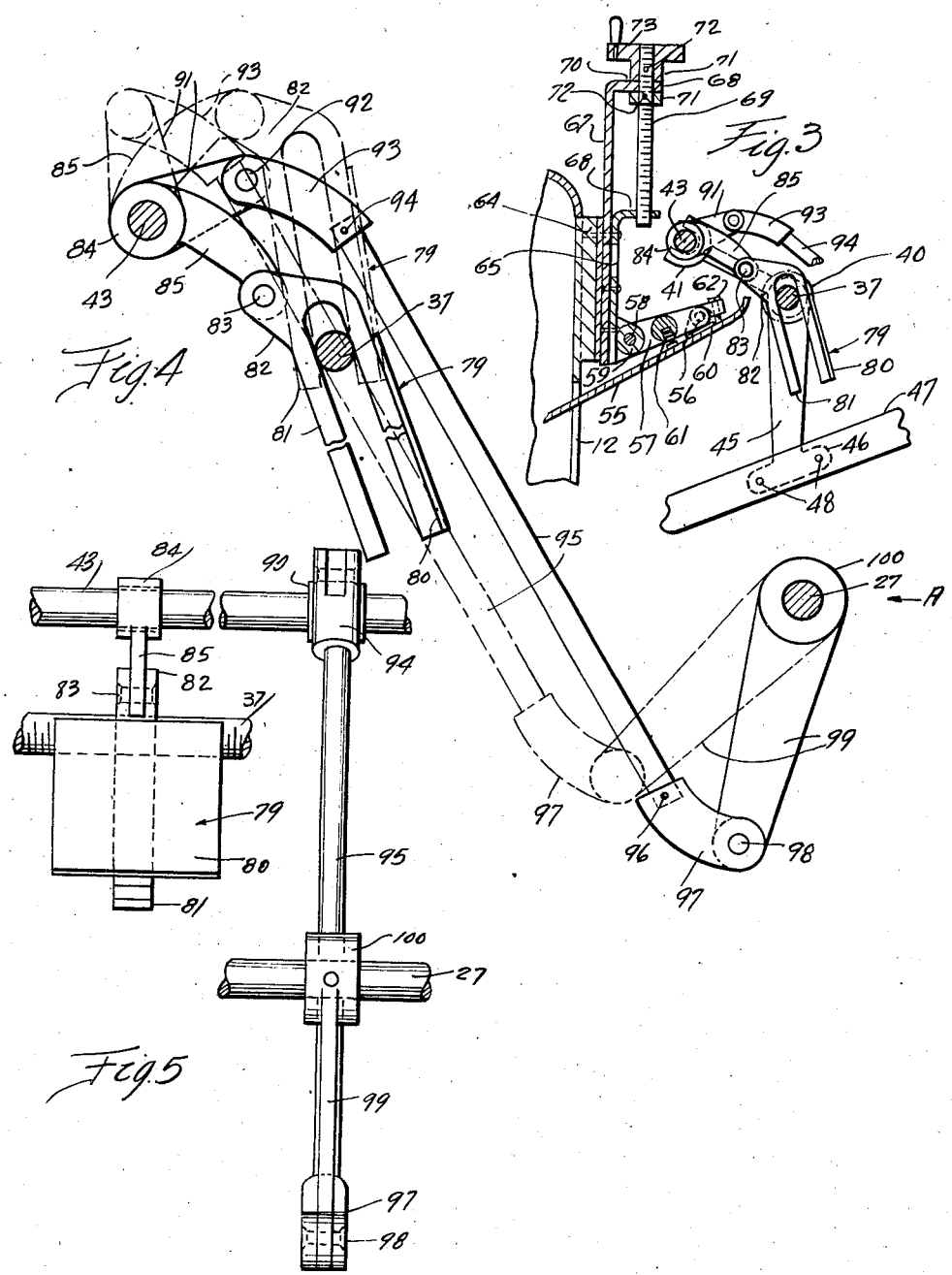

Patented Mar. 2, 1948

2,437,124

UNITED STATES PATENT OFFICE 2,437,124

FEEDING DEVICE FOR MULTIPLE BLADE BREAD SLICING MACHINES

Charles H. Petskeyes, Davenport, Iowa, assignor to Gellman Manufacturing Company, Rock Island, Ill., a corporation of Illinois Application June 9, 1945, Serial No. 598,460

1 Claim. (Cl. 146—158)

This invention relates to certain new and useful improvements in feeding device for a multiple blade bread slicing machine. The present invention contemplates an improvement over that shown and described in my copending application, Serial No. 598,455, filed June 9, 1945.

In my aforesaid pending application, the loaves of bread to be sliced are conveyed by a continuous conveyor belt to a tiltable transfer table or plate from whence the loaves of bread gravitate between the guiding structure onto an inclined chute and down which chute the loaves of bread are moved by followers to and through reciprocating slicing knives. In transferring the bread from the conveying belt to the inclined chute, the transfer table in moving to a position to dispose the loaves of bread for movement down the chute, may cause the bread to slightly tilt toward the knives or in the direction of the travel of the loaves of bread down the chute, and as a consequence the weight of the loaf of bread, when thus being thrown off balance, may have a tendency to tilt the loaf or cause the same to roll down the chute.

It is therefore an object of this present invention to provide a simple arrangement functioning as an anti-tilt device to prevent the tilting of the loaves of bread as they are being transferred from the conveyor belt to a position for movement down the inclined chute. In this connection, it is a further object of the invention to provide an arrangement whereby the anti-tilting device will operate simultaneously with the means for transferring the loaves of bread from the conveyor belt to the inclined chute, whereby the anti-tilting device will move in a plane substantially at right angles with respect to the plane of the inclined chute and at right angles with the plane of movement of loaves of bread down the chute when the transfer plate or table is moved to a position to receive the loaf of bread from the conveying belt.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 2 is a fragmentary plan view of the same;

Fig. 3 is a fragmentary sectional detail view taken substantially on line 3—3 of Fig. 2;

Fig. 4 is a side elevational view of the anti-tilting mechanism showing the parts and their respective positions for moving the blocking plate from and to blocking position;

Fig. 5 is an elevational view of the same looking in the direction of the arrow A as shown in Fig. 4.

Figure 1:
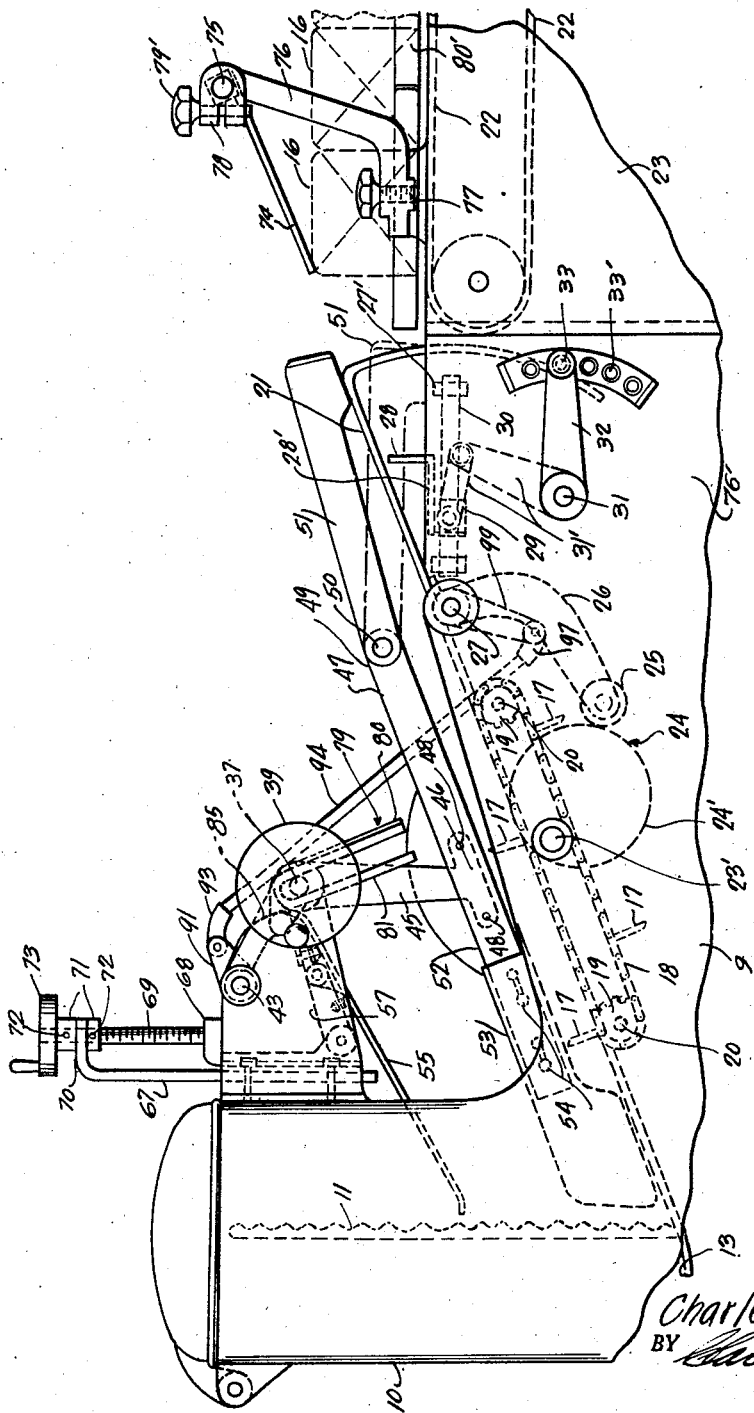
Fig. 1 is a fragmentary side elevational view of a bread slicing machine showing my invention associated therewith.

The drawings illustrate the preferred form of construction by which the several objects of my invention are accomplished.

In these drawings, I have illustrated a bread slicing machine 9 showing the invention associated therewith. This bread slicing machine includes a housing 10 within which are arranged the reciprocating slicing knives 11. Leading to the open front 12 of this housing is an inclined chute 13 which delivers the loaves of bread 16 to the knives.

Associated with this chute 13 are follower bars 17 equally spaced from each other and each adapted to cooperate with the chute 13 to move a loaf of bread down the chute 13 to the knives 11. These follower bars 17 are mounted upon sprocket chains 18, and these sprocket chains 18 operate over suitable sprocket gears 19 mounted upon shafts 20 and operated by a suitable main drive (not shown).

The upper end portion of the chute 13 comprises a transfer plate 21 upon which the loaves of bread 16 are conveyed from a belt conveyor 22 supported by a suitable structure 23. This plate 21 is pivoted to a substantial horizontal position as shown in dotted lines, to receive the bread from the conveyor belt 22. This is accomplished by means of a cam structure 24 including a cam wheel 24' mounted on a rotatable shaft 23' and a cam roller 25 carried by lever 26 secured to a shaft 27 pivotally carrying the plate 21.

The proper position of the bread 16 upon the plate 21 is governed by a plurality of equally spaced fingers 28 (Fig. 1). These fingers 28 are part of a plate 28' mounted upon brackets 29 which in turn are slidably supported upon rods 30 carried by transversely extending bars 27' secured to opposite side walls 26' of the slicing machine 9.

The mounting brackets 29 are adjusted relative to the rods 30 by means of a handle 32 releasably latched in an adjusted position by means of a detent 33 adapted to selectively engage sockets 33'.

The handle 32 is secured to an end portion of a shaft 31 and this shaft is connected to the mounting brackets 29 by pairs of links 31 (Fig. 1).

The transfer plate 21 has slots 29' formed therein for the projection of the fingers 28 when the plate 21 is in a horizontal position (see Fig. 2).

Secured to the opposite sides of the housing 10 are bracket structures 34, the ends of which terminate into suitable bearing structures 35 rotatably supporting a screw shaft 36 having right and left-hand screw threads 37 and 38 respectively, and rotatably held in place by collars 39'. This screw shaft 36 is rotated (Fig. 2) by means of a hand wheel 39.

Movable longitudinally upon the screw shaft 36 are bearing sleeves 40. These bearing sleeves 40 have extending therefrom spaced arms 41. These arms 41 are bifurcated as at 42 for engagement with a guide rod 43. This guide rod is supported between the mounting brackets 34, with opposite end portions thereof positioned in the bearing 44 of such mounting brackets.

Depending from the bearing sleeves 40 are supporting arms 45. These supporting arms 45 have their end portions 46 connected as at 48 to guide rails 47. The forward end portions 49 of these guide rails are pivotally connected as at 50 to guide arms 51 which rest upon the plate 21 and are pivoted therewith to properly guide bread 16 from the belt 22 to the plate 21. The opposite end portions 52 of these side rails are detachably connected to guide plates 53 by means of slot and bayonet connections 54. These arms 51 function to guide the loaves of bread 16 to the reciprocating knives 11 as the loaves of bread move down the chute 13.

In the course of the bread slicing operation by a machine constructed in accordance with the foregoing description, it frequently happens that the bread in its movement toward the knives 11 when conveyed down the chute 13, in bearing against the knives 11, has a tendency to buckle or raise upwardly. To prevent this, I provide an adjustable shield 55. This shield 55 is pivotally connected as at 56 to a supporting arm 57 in turn connected as at 58 to a pair of lugs 59. Engaging the end of the shield 55 inwardly from the end portion 60 is a spring 61 that normally tends to pivot the shield 55 against an adjustment screw 62 engaging the outer extremity of the end portion 60. By adjusting this screw 62, the pressure of the shield 55 upon the bread as it is passed to the knives may be varied.

The lugs 59 are formed as an integral part of an adjustable bracket 65 slidably carried by a mounting plate 67 secured as at 64 to the housing 11. This mounting bracket 65 at its upper end portion provides a lateral extension 68, into which is threaded a screw shaft 69. This threaded shaft 69 passes through a lateral extension 70 formed on the plate 67, and on opposite sides of this lateral extension 70 the shaft 69 carries collars 71 which are fixed to the shaft 69 as at 72. The upper of these collars 71 is formed as an integral part of a hand wheel 73. By rotating the hand wheel 73, the shaft 69 will be rotated and the plate 63 may be vertically adjusted so as to elevate or lower the shield 55 to compensate for the change in height of the loaves of bread.

As shown in Fig. 1, a pressure plate 74 is provided which bears upon the top surfaces of the loaves of bread 16 as they are conveyed by the belt 22 to the plate 21. This pressure plate is connected to a shaft 75 supported between brackets 76 secured to the structure 23 as at 77. Each end of the shaft 75 is journaled in a split bearing 78 clamped together by a hand screw 79', the arrangement being such that the plate 74 may be adjusted in a proper position for engagement with the tops of the loaves of bread 16. This plate 74 prevents the bread from being forced upwardly or otherwise disturbed from between the guide 80' carried by the supporting structure 23.

From the foregoing description, it will be noted that the upward pivotal movement of the transfer plate 21 may result, depending upon the speed with which it is pivoted and the height of the loaf of bread, in the loaf being tilted forwardly or in a rolling position, as distinguished from a sliding position, down the chute. If this were to result, it is manifest that the slicing operation of the machine would be greatly interfered with, requiring the operator to manually adjust the tilted or disturbed loaf of bread. To avoid this, I provide an anti-tilting device 79 comprising a blocking plate 80 carried by a bifurcated, forklike member 81 (hereinafter referred to as "fork"), working against and guided in its movement hereinafter described, by the screw shaft 37. This fork 81 is provided with a bearing 82, and this bearing 82 carries a pintle pin 83 which operatively connects to a bearing sleeve 84 by means of a link 85 formed integral with the sleeve 84. This sleeve 84 is fixed as at 86 to the guide rod 43. The opposite end portions of this rod 43 have fixed thereto, as at 87, retainer collars 88. On one end of the guide rod 43 there is secured as at 89 a bearing 90 having an integral link 91 pivotally connected as at 92 to a coupling 93. This coupling 93 has fixed thereto, as at 94, one end of a connecting rod 95, the opposite end of the rod being connected as at 96 to a coupling 97. This coupling 97 is pivotally connected as at 98 to a link 99 having a bearing 100 fixed as at 101 to the rocker shaft 27.

The arrangement is such that when the rocker shaft 27 is caused to rock by action of the cam and roller 24 and 25, respectively, the guide rod 42 will be simultaneously rocked therewith, and this rocking movement of the guide rod 43 will impart movement to the fork 81, and by reason of the operative connection between the fork 81 and the guide rod 43, through the medium of the connecting link 85 and with the cooperation of the screw shaft 37, the fork is caused to take a substantially rectilinear movement; that is, in a plane substantially at right angles with respect to the plane of the inclined chute 13 and the plane of movement of the loaves of bread down the chute, the result of such movement being a rectilinear, slidable movement from the leading face of the loaf of bread, as distinguished from an arcuate movement in the direction of movement of the loaf of bread. By virtue of this movement, the blocking plate 80 will remain in the path of movement of the loaf of bread sufficiently long enough to allow the loaf of bread to right its position upon the inclined chute for movement therealong as soon as the blocking plate 80 has been moved in the manner hereinbefore stated. Where the movement of the blocking plate 80 is through an arcuate line away from the leading face of the loaf of bread, it would result in permitting the loaf of bread to continue its tilting or rolling motion down the chute. By the type of movement of the blocking plate 80 as employed in my construction, this cannot result.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

The combination with a bread slicing machine having a plurality of reciprocating slicing knives and an inclined chute upon which loaves of bread to be sliced are adapted to be moved toward the slicing knives, means providing a guideway for movement of said loaves of broad down the chute, and means for conveying loaves of bread to be sliced to the upper end portion of said chute, of means for successively transferring said loaves of bread from said conveying means to the upper end of the chute comprising a tiltable plate, means for intermittently tilting said plate, and anti-tilting means including a single blocking plate located adjacent the upper end of the chute and above the same, and in the path of the loaves of bread transferred to said upper end of the chute by said transfer means, means for moving the blocking plate substantially in the plane of said plate into and out of the path of the loaves of bread, and means providing an operative connection between said blocking plate moving means and said plate tilting means whereby the anti-tilting means will be moved from the path of movement of the loaves of bread when the plate is moved to a position to receive a loaf of bread from the conveying means.

CHARLES H. PETSKEYES.

REFERENCES CITED

The following references are of record in the file of this patent:

UNITED STATES PATENTS

| Number | Name | Date |
| --- | --- | --- |
| 2,131,256 | Petskeyes | Sept. 27, 1938 |
| 2,281,936 | Hoppe | May 5, 1942 |
| 2,292,800 | Rose | Aug. 11, 1942 |
| 2,293,053 | Ferenci | Aug. 18, 1942 |
| 2,379,911 | Kottmann | July 10, 1945 |